April 17, 1956 H. E. METCALF 2,742,068
CHERRY STEMMER
Filed June 20, 1952 4 Sheets-Sheet 1

INVENTOR:
HERBERT E. METCALF
HIS PATENT ATTORNEY

April 17, 1956

H. E. METCALF 2,742,068

CHERRY STEMMER

Filed June 20, 1952

INVENTOR:
HERBERT E. METCALF

By Herbert E. Metcalf
HIS PATENT ATTORNEY

April 17, 1956 H. E. METCALF 2,742,068
CHERRY STEMMER
Filed June 20, 1952 4 Sheets-Sheet 3

INVENTOR:
HERBERT E. METCALF
By Herbert E. Metcalf
HIS PATENT ATTORNEY

April 17, 1956  H. E. METCALF  2,742,068
CHERRY STEMMER
Filed June 20, 1952 4 Sheets-Sheet 4
Fig. 7
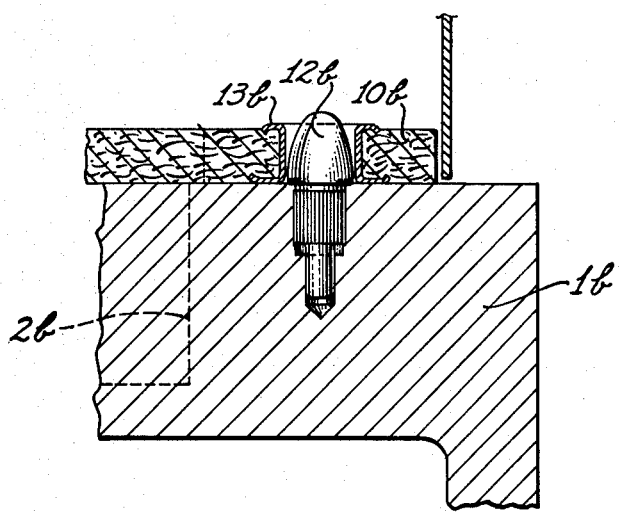
Fig. 8
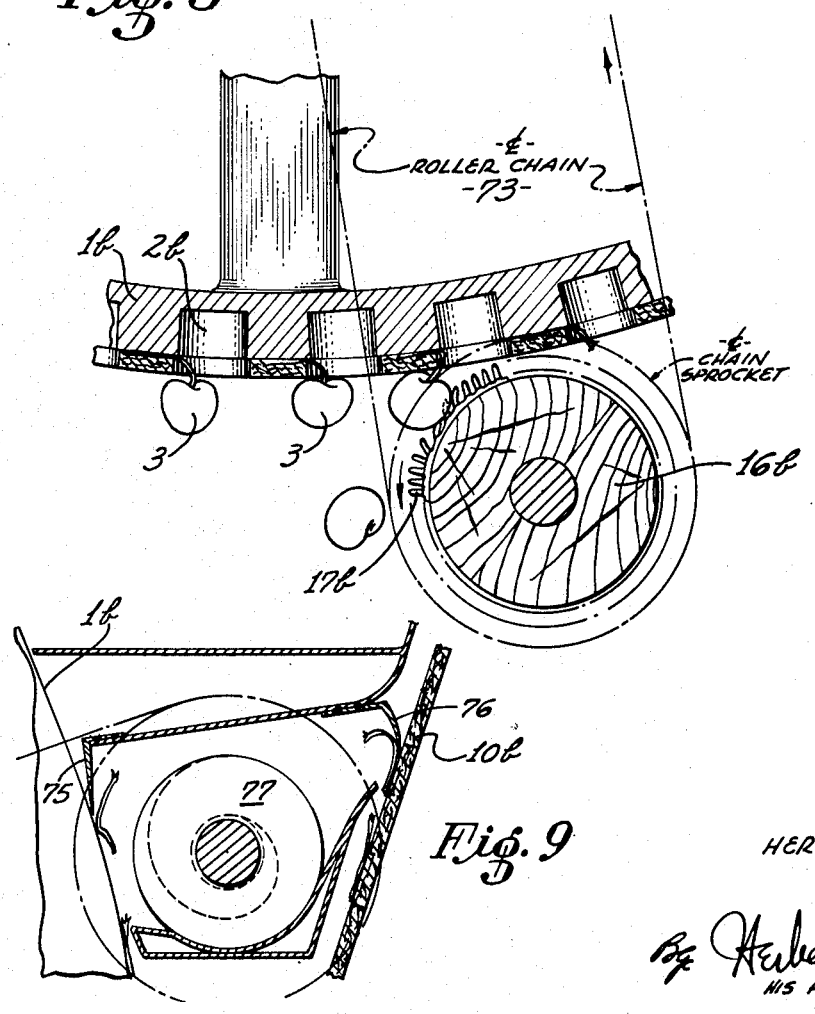
Fig. 9
INVENTOR:
HERBERT E. METCALF
HIS PATENT ATTORNEY United States Patent Office 2,742,068
Patented Apr. 17, 1956

2,742,068
CHERRY STEMMER

Herbert E. Metcalf, Los Angeles, Calif., assignor to S & W Fine Foods, Inc., San Francisco, Calif., a corporation of California Application June 20, 1952, Serial No. 294,606

9 Claims. (Cl. 146—55)

My invention relates to means for removing stems from stemmed fruit and, more particularly, to cherry stemmers of the general type exemplified by the U. S. Patent to Urschel, Serial No. 1,409,803, dated March 14, 1922.

Among the objects of the present invention are:

To provide a simple and efficient means for removing fruit from the stems thereof;

To provide a fruit stemming device operated on a positive rather than a probability basis;

To provide a fruit stemmer of relatively few parts and adapted for relatively simple, positive drives for said parts;

To provide a fruit stemmer particularly useful in stemming cherries of random sizes;

To provide a cherry stemmer wherein fruit damage is negligible; and

To provide a means for stemming fruit capable of high speed operation over long periods.

In brief, the present invention in one form provides for a fruit carrier having a plurality of fruit receptacles thereon in which fruit such as cherries having stems still attached thereto are loaded, one to a receptacle, while the receptacles are in a position opening generally upwardly. The receptacles are dimensioned to have at least part of the stems thereof projecting above the upper surface of the carrier and generally beyond the edges of the receptacle edges.

Stem gripping means, such as a relatively thin belt, for example, is laid over the fruit carrier to grip the projecting stems between the upper surface of the fruit carrier and the lower surface of the gripper belt. The gripper belt has apertures therein arranged to register with the receptacle openings as the fruit carrier is progressed over a path where the receptacle openings come to open generally downwardly. This new position causes the fruit to fall out of the receptacles through the apertures in the gripper belt while the stems are still gripped into the path of a means, such as a brush, to separate the fruit from the still gripped stem. The gripper belt is then directed away from the fruit carrier to permit a new lot of fruit to be loaded. As the cycle can be made continuous, the output of stemmed fruit can be made high.

My invention will be more clearly understood by reference to the drawings, in which:

Figure 7 is an enlarged fragmentary view partly in section and partly in elevation of the stem gripping belt drive used in the device of Figure 6.

Figure 8 is an enlarged view partly in section and partly in elevation of a portion of the drum and stem gripping belt of the device shown in Figure 6, showing how the fruit is separated from the stems thereof.

Figure 9 is an enlarged fragmentary sectional view of a portion of the machine of Figure 6 showing the stem collector.

Referring first to Figures 1 to 4 to describe the principle upon which the present invention is based, a carrier 1, which may be a belt or a drum, is provided with receptacles 2 to receive and hold against gravity a fruit 3 having stems 4 which it is desired to separate from the fruit. Such fruits are cherries and plums, for example, and the machines to be hereinafter described are designed to de-stem cherries.

Figure 1:
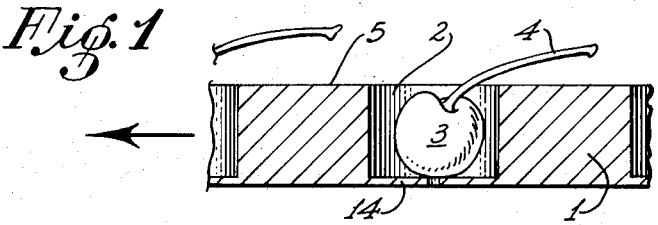
Figures 1 to 4 are cross sectional diagrams illustrating the principle of the present invention.
Figure 2:
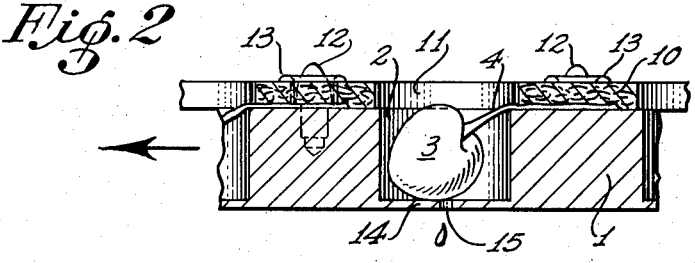

Receptacles 2 are made wide enough and deep enough to receive all but the abnormally large fruit to be processed, but no harm will be done by having the fruit project slightly above the upper carrier surface 5 when loaded. The stems 4 of the fruit after loading project above this latter surface, as shown in Figure 1. In this position, a stem gripping belt 10 is shown having therein exit apertures 11 the same or slightly larger diameter than that of the receptacles 2. Registry of exit apertures 11 and the receptacles 2 is insured as by pins 12 projecting above the upper surface of carrier 1, entering eyelets 13 in the stem gripper belt 10, as shown in Figure 2.

The receptacles 2 are provided with permanent bottoms 14 preferably having a small central hole 15 for liquid drainage.

Figure 3:
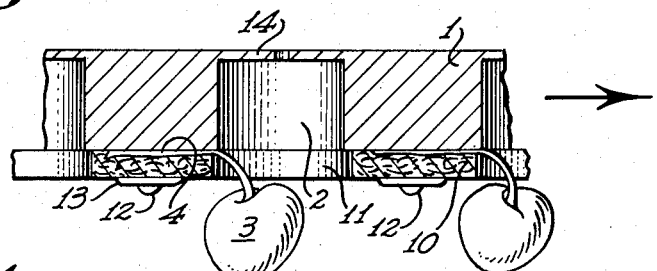
Figure 4:
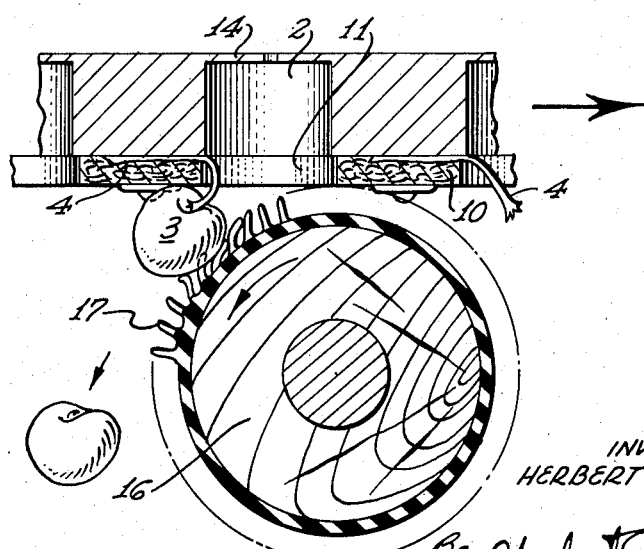

With the stems gripped, the carrier 1 and stem gripper belt 10 are turned over together as they progress, so that the fruit 3 falls out of the receptacles 2 through the exit apertures 11, by gravity, held only by their gripped stems as shown in Figure 3. While they are in this suspended position, a rotary de-stemming brush 16 having flexible fingers 17 bears against the suspended fruit and separates it from the gripped stem, as shown in Figure 4.

Figure 5:
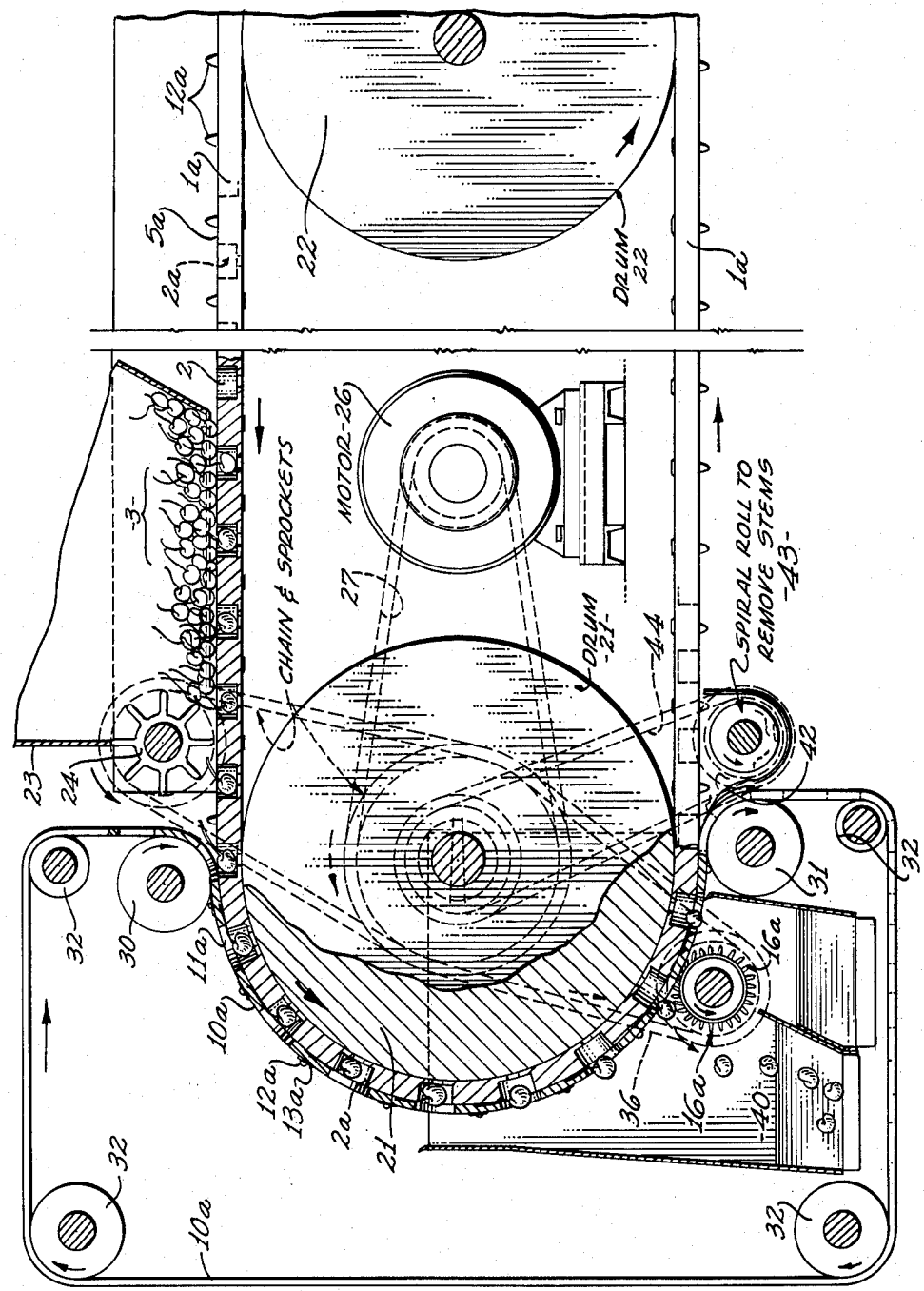
Figure 5 is a vertical longitudinal sectional view, parts of which are in elevation, of one form of stemmer built in accordance with the principle illustrated in Figures 1 to 4.
Figure 6:
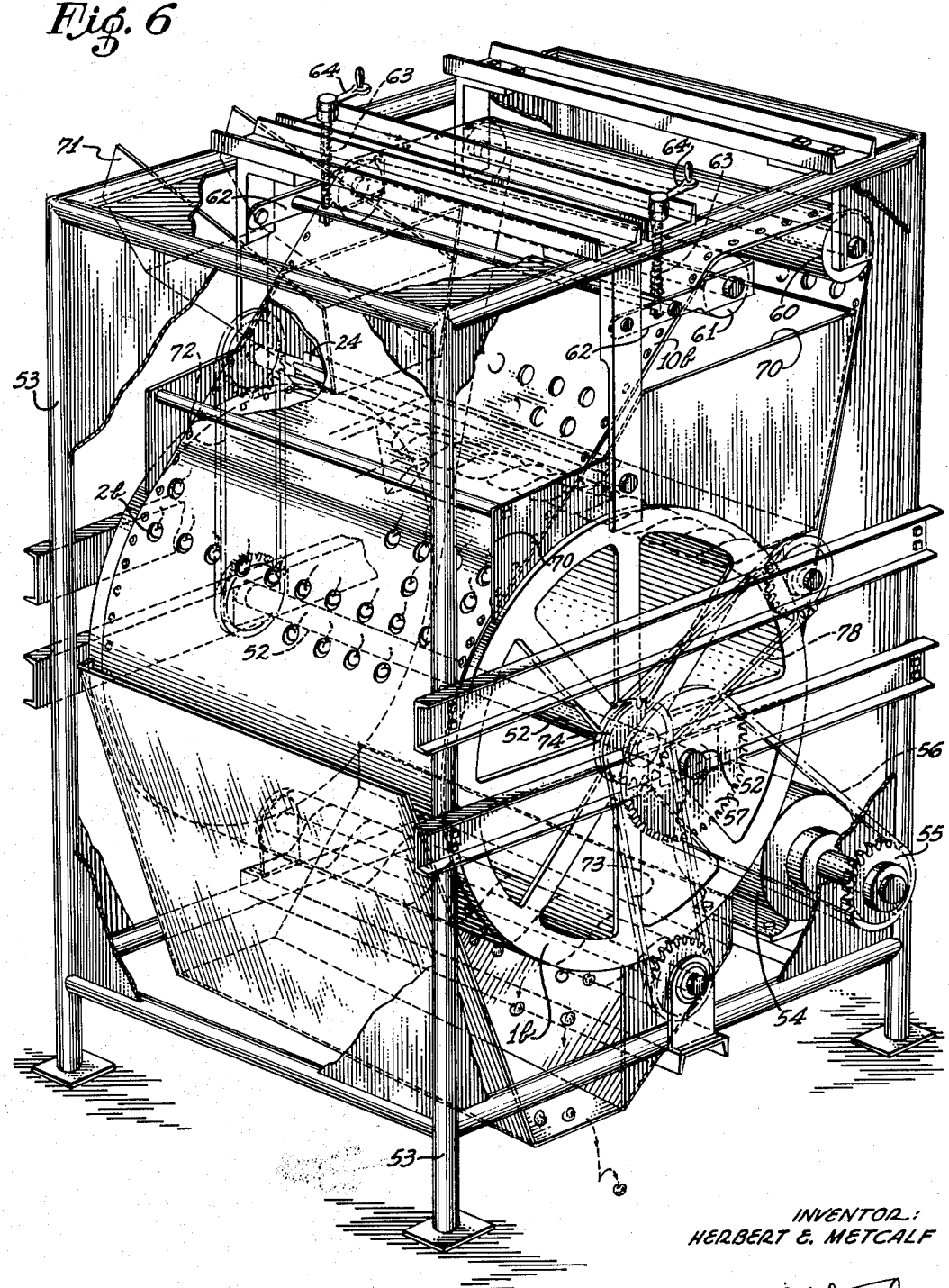
Figure 6 is a perspective view of another form of stemmer embodying the present invention.

The principle of Figures 1 to 4 will be discussed herein as embodied in two types of machine, one with the carrier 1 in the form of a belt, the other with the carrier 1 in the form of a drum. The belt carrier machine is shown in Figure 5 and will be first discussed.

An endless carrier belt 1a is stretched between a drive drum 21 and an idler drum 22 rotatable on horizontal axes. The top surface 5a of the carrier belt can be horizontal, or rise at an angle to the drive drum 21, as may be desired. The carrier belt 1a is provided with upwardly opening fruit receptacles 2a.

Cherries 3 having stems attached thereto are fed into a hopper 23 onto the top surface 5 of the carrier belt 20 and are brushed with a loading brush 24 to prevent the cherries not in receptacles 2a from passing onward as the drive drum 21 is rotated counterclockwise as illustrated by motor 26 through a main chain drive 27.

As the carrier belt 1a starts around the drive drum 21 a relatively thin endless stem gripper belt 10a is laid over the carrier belt after passing around a top directing roller 30. This gripper belt continues to be in contact with and overlays the carrier belt 1a until the latter starts to leave the drive drum 21, at the bottom thereof. The stem gripper belt 10a then leaves the carrier belt by passing around bottom directing roller 31, and then returns to the top directing roller 30 after passing outwardly around outer idler rollers 32.

The stem gripping belt 10a is provided with exit apertures 11a positioned to match carrier receptacles 2a and is driven so that the exit apertures 11a register with the tops of the receptacles 2a by the use of the drive pins 12a projecting above the carrier belt 1a and entering eyelets 13a in the gripper belt 10a, as shown in Figure 2, previously described.

As the cherries pass around the drive drum 21 they are held only by their gripped stems, so that as the bottom of drive drum 21 is approached the fruit fall out of the receptacles by gravity and are separated from their stems by rotating separation brush 16a also rotated counterclockwise by separation brush chain 36 driven by the rotation of drive drum 21. The separated fruit fall into exit chute 40 and the stems continue to be held until the lower directing roller 31 is reached. As this happens, a scraper blade 42 is positioned to direct stems into a crosswise positioned spiral conveyor 43 to move the stems laterally to one side of the machine for disposal. Conveyor 43 is driven by stem conveyor chain 44 from drive drum 21.

In Figures 6 to 9, inclusive, a machine is shown which utilizes a drum as a main carrier. Here, a carrier drum 1b is provided with rows of fruit receptacles 2b on the peripheral surface thereof. This drum is mounted on a horizontal shaft 52 in a frame 53 and is rotated by a motor 54 through motor sprocket 55, main drive chain 56, and drum drive sprocket 57.

In this case, the endless stem gripper belt 10b is laid over carrier drum 50 from above, contacting the carrier drum (which is rotated counterclockwise as viewed in Figure 6) at about 11 o'clock, passing around the carrier drum 50, and leaving the carrier drum on the other side at about 4 o'clock to pass upwardly to an idler roller 60 spaced from a tension roller 61 to return to carrier drum 1b at the 4 o'clock position.

Tension roller 61 is mounted on tension roller end arms 62 extended from frame 53, tightening being accomplished by screws 63 operated by handles 64, one screw 63 being applied to each end arm 62. In this case, pins 12b are inserted in the periphery of carrier drum 1b on each side thereof to enter eyelets 13b in the stem gripper belt 10b, as best shown in Figure 7. Thus, the stem gripper belt 10b is driven by the carrier drum in much the same manner as a motion picture film is driven.

An inner loading hopper 70 is placed over the carrier drum 1b just before belt 10b approaches the carrier drum 1b, this hopper being fed, for example, by a feed chute 71.

The rotating loading brush 24 is provided across the carrier drum 1b just prior to the overlay of the stem gripper belt 10b so that only one fruit will lodge in any one receptacle. This brush 24 is driven by loading brush chain 72 from the opposite side of the carrier drum from that of the motor drive.

As the stem gripper belt 10b overlays the carrier drum 1b, registry of the exit apertures 11b therein with the receptacles 2b occurs, so that at the bottom of the drum, as shown in Figure 8, the fruit 3, held only by the stems thereof, fall out of the receptacles through the exit apertures 11b in the stem gripper belt 10b and are then removed from their stems by the rotating stemming brush 16b, this latter having elastic fingers 17b and being driven by stemming chain 73 from a carrier drum shaft sprocket 74 along side main drive sprocket 57.

As the stem gripper belt 10b leaves the carrier drum 1b, stem scrapers 75 and 76 remove the stems from drum 1b and belt 10b respectively, these stems being removed laterally by spiral conveyor 77 driven by chain 78 from drum sprocket 74, as best shown in Figure 9.

Thus in both of the machines described herein, the cherries are loaded into and are removed from the receptacles on the same side of the carrier, following the principles illustrated in Figures 1 to 4, inclusive.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

I claim:

1. A cherry stemmer comprising in combination a movable conveyor having an open receptacle therein sized to receive and support a cherry with attached stem therein, a chute associated with said stemmer and operative to feed a cherry into said open receptacle with the stem thereof extending out of said open receptacle, stem gripping means relatively movable with said conveyor to descend to a position in pressure contact with said conveyor around said receptacle to grip said stem therebetween, said stem gripping means having an aperture of the same size as the opening of said receptacle and registerable therewith as said conveyor and said gripping means move into pressure contact together, interlocking means associated with said conveyor and gripping means to maintain said receptacle opening and gripping means aperture in registration with said stem gripped therebetween, said conveyor being movable to an inverted position to drop said cherry by gravity downwardly out of said receptacle to hang by gravity below the level of said aperture solely by the gripped stem thereof, and flexible wiping means movable in a direction opposite to that of said conveyor and positioned to meet said suspended cherry and wipe said cherry downwardly to separate said cherry from the gripped stem thereof.

2. Apparatus in accordance with claim 1 wherein said conveyor is a power driven rotatable circular drum.

3. Apparatus in accordance with claim 1 wherein said conveyor is a power driven rotatable circular drum, and said stem gripping means is an endless belt driven by said circular drum.

4. Apparatus in accordance with claim 1 wherein said conveyor is a power driven rotatable circular drum, said stem gripping means is an endless belt supported to move into contact with said drum after a cherry has been fed into a receptacle thereof and move out of contact with said drum after said cherry has been separated from the gripped stem thereof, and wherein said interlocking means is a series of spaced pins mounted to extend perpendicularly from the surface of said drum and engageable with a series of complementally spaced eyelets in said gripping means, said rotatable drum driving said gripping means by said engageable pins and eyelets.

5. Apparatus in accordance with claim 1 wherein said conveyor is a power driven endless belt and said gripping means is a second endless belt, and wherein said power driven belt and said second belt are mounted and positioned to contact each other after a cherry has been fed into a receptacle to grip the stem of said cherry therebetween, and wherein said interlocking means is a series of spaced pins extending perpendicularly from the surface of said driven belt and engageable with a series of complementally spaced eyelets in said second belt, said power driven belt driving said second belt by said engageable pins and eyelets.

6. In a fruit stemmer, a rotatable drum provided with a plurality of outwardly opening fruit receptacles, a feed chute leading to the top of said drum, a delivery chute leading from the bottom of said drum, and an endless stem gripping belt supported and positioned to move into contact with the peripheral surface of said drum between said feed chute and said delivery chute, said stem gripping belt having a plurality of apertures therein registerable with the openings of said receptacles while in contact with said drum, and rotatable wiping means mounted at the bottom of said drum for downwardly wiping fruit suspended by gravity from said drum and belt by the stems thereof gripped between said drum and belt at the edges of said registered receptacle and aperture openings.

7. A cherry stemmer comprising in combination an endless conveyor having a plurality of open receptacles sized to recess and support a cherry against gravity, a chute mounted above said conveyor and operative to feed a cherry having an attached stem into each of said open receptacles when said receptacles are in a position opening upwardly under said chute, the stems of said recessed cherries extending out of the openings of said receptacles, an endless stem gripping belt supported and positioned to move into pressure contact with said conveyor around said receptacles immediately after a cherry has been fed thereinto to grip said cherry stem tightly between said conveyor and said stem gripping means, said gripping belt having an aperture for each receptacle and registerable with each receptacle opening, a series of spaced driving pins extending perpendicularly from the surface of said conveyor adjacent to said receptacles, a series of eyelets in said stem gripping belt adjacent to said eyelets and complementally spaced therein to align and interlock with said driving pins to drive and maintain said conveyor and said gripping belt in pressure contact with said receptacle openings and apertures in registration, said conveyor and gripping belt being movable together to a position inverting said receptacles to drop said cherry by gravity downwardly out of said receptacle to suspend said cherry below the level of said registered receptacle opening and aperture solely by the gripped stem thereof, and an endless rotatable flexible wiping member positioned with respect to said suspended cherry to meet and contact said cherries with a downward wiping movement to separate said cherries from the gripped stems thereof.

8. Apparatus in accordance with claim 7 wherein said endless conveyor is a rotatable power driven circular drum.

9. Apparatus in accordance with claim 7 wherein said endless conveyor is a power driven belt.

References Cited in the file of this patent

UNITED STATES PATENTS

| | | |
|---|---|---|
| 1,076,794 | Smith | Oct. 28, 1913 |
| 1,409,803 | Urschel | Mar. 14, 1922 |
| 2,360,412 | Frova | Oct. 17, 1944 |
| 2,462,682 | Schubert | Feb. 22, 1949 |
| 2,656,867 | Aguilar et al. | Oct. 27, 1953 |
| 2,667,196 | Aguilar et al. | Jan. 26, 1954 |
| 2,668,619 | Wormser et al. | Feb. 9, 1954 |

FOREIGN PATENTS

| | | |
|---|---|---|
| 392,110 | Germany | Mar. 15, 1924 |
| 819,314 | France | July 5, 1937 |
| 597,543 | Great Britain | Jan. 28, 1948 |